United States Patent [19]

Klein

[11] 4,044,708
[45] Aug. 30, 1977

[54] TRANSILLUMINATED DIAL PRESENTATION

[75] Inventor: Herman C. Klein, Los Angeles, Calif.

[73] Assignee: McDonnell Douglas Corporation, Long Beach, Calif.

[21] Appl. No.: 598,183

[22] Filed: July 23, 1975

[51] Int. Cl.² .......................................... G01D 11/28
[52] U.S. Cl. ................. 116/129 P; 240/2.1; 313/499
[58] Field of Search ............... 116/129 P, 129 R; 40/130; 240/2.1; 313/113, 499, 500; 340/373

[56] References Cited

U.S. PATENT DOCUMENTS

| | | | |
|---|---|---|---|
| 2,009,209 | 7/1935 | Scantlebury | 116/129 F |
| 2,824,954 | 2/1958 | Roper | 116/129 R X |
| 2,868,960 | 1/1959 | Appel et al. | 240/2.1 |
| 2,886,911 | 5/1959 | Hardesty | 240/2.1 |
| 3,174,067 | 3/1965 | Bahrs | 313/113 X |
| 3,503,365 | 3/1970 | Baez et al. | 116/129 R |
| 3,732,560 | 5/1973 | Harden et al. | 340/373 |
| 3,821,590 | 6/1974 | Kosman et al. | 240/2.1 X |
| 3,867,623 | 2/1975 | Widlund | 240/2.1 |

Primary Examiner—Richard C. Queisser
Assistant Examiner—Daniel M. Yasich
Attorney, Agent, or Firm—Max Geldin

[57] ABSTRACT

A dial display of transilluminated instruments includes a negative or color transparent film of the pointer and dial face of an instrument, in contact with a diffuser element such as a Mylar (polyester) film, the negative film and diffuser being laminated to a high light transmission element such as an acrylic material to provide a rigid concentric pointer drum and dial face assembly, and light emitting diodes and reflector means mounted for back lighting the transparent negative film. Light from the light emitting diodes (LED) is reflected between the reflector assembly and diffuser surface, and produces a uniformly lighted dial and pointer presentation. The color of the pointer and dial face indicia is formed directly by the color of the diffuser material at the exposed areas on the developed negative film. Various other modifications of the invention include use of a reverse silk screened diffuser instead of a negative film, in combination with the diffuser, e.g. a white diffuser, wherein the pointer and dial face displays are reverse silk screened directly on the diffuser, and wherein the white color of the diffuser material forms the display marks or indicia. Further, the diodes can be oriented toward the diffuser surface instead of toward the reflector surface, and different wavelength light emitting diodes can be used. Also there can be employed different colored diffusers or different wavelength filters between the negative and diffuser surfaces.

25 Claims, 7 Drawing Figures

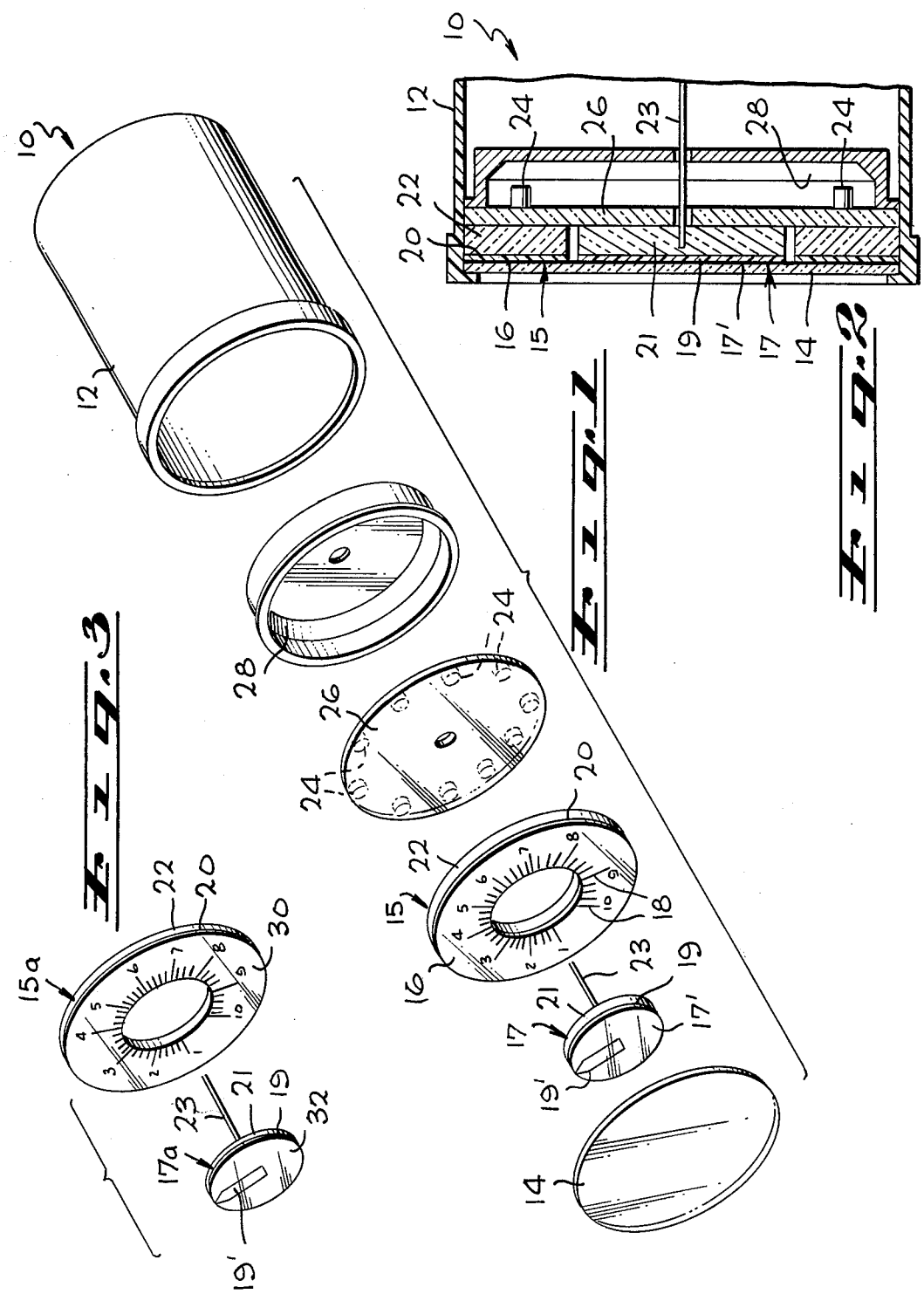

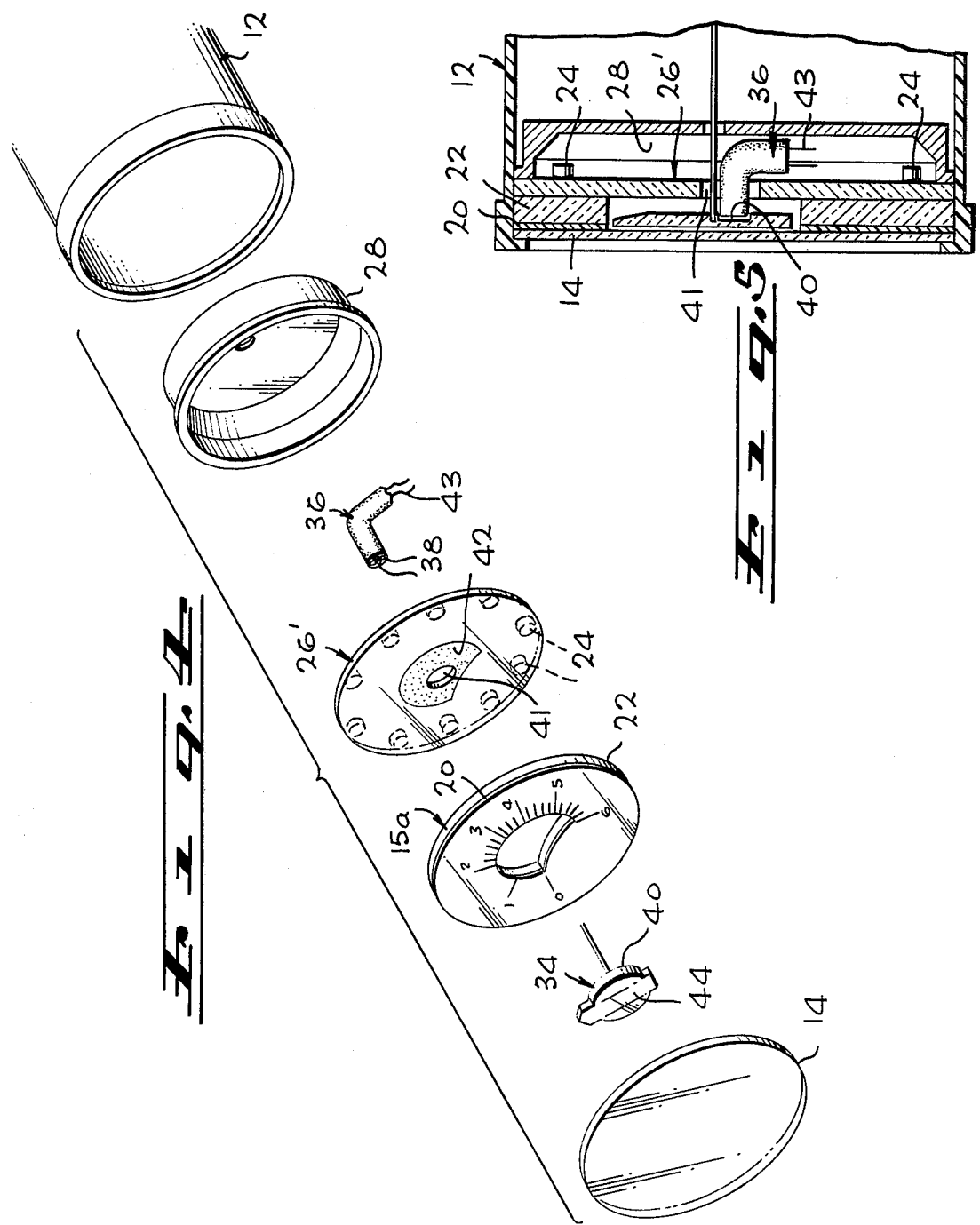

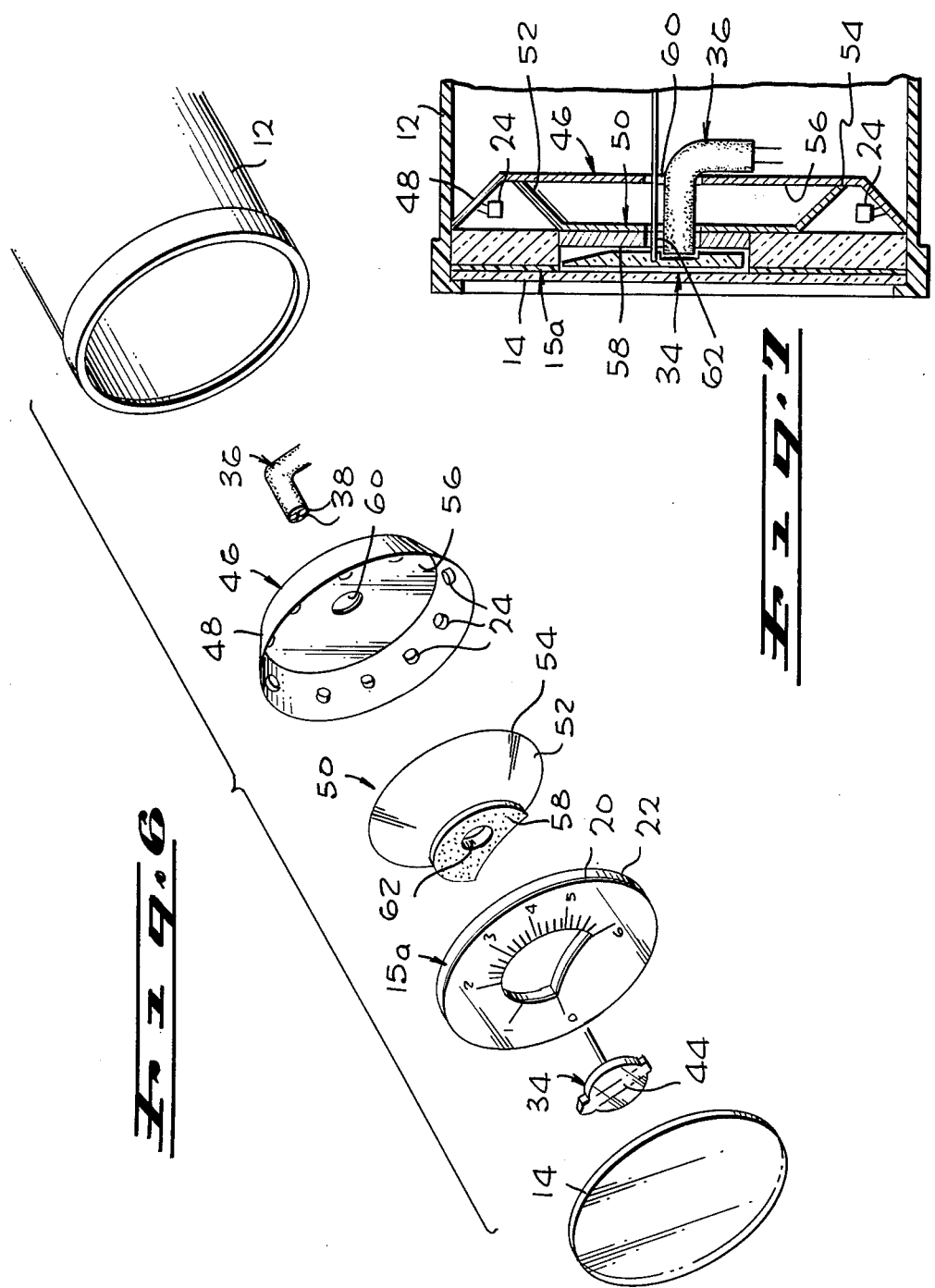

TRANSILLUMINATED DIAL PRESENTATION

BACKGROUND OF THE INVENTION

The present invention is concerned with improved instrument lighting systems, and is particularly concerned with the provision of indicator dial systems or displays for instruments employing light emitting diodes for illumination.

Incandescent lamps are usually employed to illuminate cockpit instrument displays, but these lamps generate a considerable amount of heat. This heat has often contributed to the premature failure of internal electronic components used in standard displays. In addition, incandescent lamps consume a great deal of power and are easily damaged by shock and vibration. Accordingly, a more effective, more reliable means of illumination is needed to solve the above problem, particularly in conjunction with an instrument dial display system which provides a high contrast ratio between the dial indicia and dial face background, and which causes the lighted dial indicia and pointer to exhibit a specified brilliance or lighted color presentation.

U.S. Pat. No. 3,732,560 discloses a rotatable drum indicator which uses light emitting diode back lighting, with the drum being molded from suitable near-transparent or highly translucent plastic material. However, present dial and light-plate designs do not permit a satisfactory lighted display with light emitting diodes in that the white paint or white colored areas in the presently employed silk screen types of dial designs absorb or attenuate too much light and fail to provide a satisfactory lighting presentation with newly developed light sources, particularly light emitting diodes, and such light sources have a much lower intensity than incandescent lamps.

U.S. Pat. No. 3,503,365 discloses translucent instrument dial means which comprises a three disk assembly including a front disk which can be formed of a plastic film, preferably a black tinted plastic overlay material such as the material marketed as "Lexan" or a photographic negative which has been exposed to light and developed, a center transparent disk and a rear translucent disk. The indicia on the exposed film is formed of an opaque light colored material such as white ink or paint. The patent discloses a light source that is enclosed within a light diffuser and is directed towards the three disk assembly.

U.S. Pat. Nos. 2,395,718 and 2,427,896 disclose instrument display systems making use of "Polaroid" or light-polarizing characteristics.

Other patents disclosing prior art instrument display systems include U.S. Pat. Nos. 2,518,726; 2,824,399; 2,663,107; 2,637,296; and 2,824,954.

Accordingly, one object of the invention is the provision of improved presentations of instrument dial displays, particularly for aircraft instruments. A further object is the employment of light emitting diodes effectively as a source of light in lighting display systems for aircraft, to provide lighted presentations which exhibit a high illumination level and which offer the advantages of long life, lower power consumption and absence of internal heating. A particularly important object is the provision of transilluminated dial presentations for instruments, particularly aircraft instruments, utilizing light emitting diodes as a light source, in combination with a novel instrument dial display, and presentation system, which offers the above noted advantages of the use of light emitting diodes while at the same time providing dial displays which satisfy commercial and military color and/or brightness requirements and which exhibit a uniform color and brightness presentation ranging from maximum illumination to brightness levels near extinction.

DESCRIPTION OF THE INVENTION

The above objects and advantages are achieved according to the invention by the provision of an indicator dial system comprising a display in the form of a front layer of a photographic film or a reverse silk screened presentation of an instrument dial face and pointer assembly, a center layer of a diffuser or translucent material, and a rear layer of high light transmitting material. In conjunction with such instrument dial presentation, there is provided light emitting diode means mounted to the rear of the high light transmitting material and preferably reflector means for directing light from the light emitting diode source to the dial display presentation systems noted above.

In accordance with one of the above embodiments, a developed negative of the dial display and pointer drum is placed in contact with a diffuser material surface and the indicia on the negative film is formed by the color of the diffuser at the exposed areas on the developed negative. In the other modification noted above, employing a reverse silk screened presentation of the dial face display on the surface of the diffuser element, the indicia of the dial display is again formed by the color of the diffuser material. In both cases the dial background can be a solid, homogeneous color and the pointer also can be formed of the color transmitted through the diffuser.

For the dial face, a black and white picture or a colored picture is taken of the proposed dial face presentation and the developed negative is used for the display presentation. A light diffuser layer of any suitable color, and formed of a suitable plastic, preferably a polyester material such as Mylar, or a vinyl material, is placed behind the developed negative, and the diffuser is then placed in contact with a high light transmission material also in the form of a plastic such as clear acrylic or equivalent clear material, and the negative film and diffuser element are laminated to the high light transmission material to provide dial face rigidity and protect the dial face assembly from the environment.

The developed negative can take a form where the indicia thereon is illuminated against a dark background, or where the background of the dial face is illuminated, with dark indicia employed. The system will also permit the use of colored markings to form a part of the dial presentation by the use of one or a combination of the following: colored film; colored diffuser with black and white or colored film; and a different wavelength light source.

The diffuser which is placed behind the developed negative performs two major functions, namely, it diffuses the light to uniformly illuminate the dial display, and contains a certain transmission factor to cause the dial display to exhibit a specific brightness and color presentation, and provides a high contrast ratio between the display presentation and diffuser to make the display fully readable in a high ambient light environment or with the lighting system de-energized.

In the modification wherein a reverse silk screened presentation of the dial face is employed instead of a photographic film or negative, in affect the film and diffuser element are formed into a single component by the reverse screening process.

The dial pointer or concentric dial pointer drum presentation is provided by the same technique described above, namely such assembly is comprised of the same above components as the dial face display, namely a negative or reverse screened presentation of the dial pointer drum, a diffuser element and the high light transmission, e.g. acrylic, mounting.

The light emitting diodes are mounted to the rear of the high light transmission material and toward the reflector further to the rear. The reflector can be a metal or any other light reflecting surface, e.g. plastic coated with a reflective surface, such as silver. Light emitted by such diodes is reflected from the reflector to the diffuser and upon transmission through the diffuser provides a uniformly lighted dial presentation. However, the light emitting diodes can be oriented toward the dial diffuser surface or the reflector surface. In lieu of the reflector and light emitting diode assemblies, the light emitting diodes can be potted and reflecting surfaces can be added to the exterior rear and side areas of the potting material.

Suitable commercially available light emitting diodes can be employed, and are available in the red, green and yellow wavelengths. Such diodes include gallium arsenide phosphide (GaAsP) and gallium phosphide (GaP) diodes. Discrete diodes of a specified luminous intensity illuminate the main dial face. The number of light emitting diodes employed will depend on requirements such as the size of the dial presentation, display brightness and light pattern distribution of the diodes used. As previously noted these diodes usually are pointed toward the reflector at the rear of the lighting head and are set at a specified predetermined distance apart to produce a maximum high-intensity light coverage. Light is reflected evenly from the reflector surface to the diffuser surface of the dial face assembly.

For the transilluminated pointer display, as noted below, specially ground and polished diodes can be formed into a thin, flat assembly on the light bar, enabling a maximum wide-angle coupling of the light flux into the pointer cavity.

Although the dial face and pointer assemblies noted above are particularly advantageous for use with light emitting diodes, these same systems can be employed with incandescent lighting displays to advantage.

The invention will be more clearly understood by reference to the detailed description below of certain preferred embodiments, taken in connection with the accompanying drawings wherein:

FIG. 1 is an exploded view of a transilluminated dial and concentric pointer drum display using a negative film and diffuser arrangement;

FIG. 2 is a longitudinal section of the assembly of the elements of FIG. 1;

FIG. 3 illustrates a modification of the device of FIG. 1, employing a reverse silk screened presentation and diffuser arrangement for both the dial face display and pointer display;

FIG. 4 is an exploded view of another modification of the assembly of FIGS. 1 and 3;

FIG. 5 is a longitudinal section of the assembly of the elements of FIG. 4;

FIG. 6 is an exploded view of a still further modification of the device illustrated in FIG. 4; and FIG. 7 is a longitudinal section of the assembly of the elements of FIG. 6.

Referring to FIGS. 1 and 2 of the drawing there is shown a transilluminated dial and concentric pointer drum display for a temperature recording aircraft instrument, indicated at 10, comprising an instrument cover case 12 and an instrument cover glass 14, preferably having a reflection reducing coating thereon. Mounted within the instrument cover case 12 are the dial face and pointer display arrangements 15 and 17, respectively, for the instrument. In the dial face display arrangement 15, numeral 16 is a developed negative of a picture of the dial face display of the instrument, with the markings and indicia of the dial face indicated at 18 on the negative. the developed negative is placed on top of a diffuser element 20 which can be in the form of a thin film of Mylar (polyester) of a thickness, for example, of about 0.008 inch, the diffuser being of any suitable color such as white.

The developed negative 16 and diffuser element 20 are together laminated to a clear high light transmission material 22 such as a clear acrylic or equivalent clear material such as glass, with the diffuser 20 disposed between the negative 16 and the transparent or high light transmitting element 22.

A plurality of light emitting diodes 24, here shown as ten in number, are mounted in equally spaced relation around the periphery of a high light transmitting or transparent element 26, the number and orientation of the light emitting diodes (LED) depending on the display presentation to be lighted as well as the light distribution pattern of the respective light emitting diodes employed. The light emitting diodes 24 are pointed towards a cup shaped reflector 28 disposed to the rear, that is on the opposite side of the light emitting diodes 24, from the diffuser 20 and associated negative film 16. The light emitting diodes are connected to an external circuit in conventional manner (not shown), and each diode can take, for example, up to 50 milliamperes of D.C. current.

For the pointer display presentation 17, there is also provided a developed negative 17' of the concentric pointer drum assembly including pointer 19', which is placed over a diffuser 19 of the same type as the diffuser 20, the elements 17' and 19 also being laminated to a clear light transmission material 21 such as a clear acrylic plastic, similar to the light transmitting material 22 of the dial face display arrangement 15. A mechanical pointer shaft 23 is axially centrally attached to the light transmission element 21, and extends rearwardly, for rotating the pointer drum assembly.

As seen in FIG. 2, the materials 22 and 21 of the dial face and pointer display arrangements 15 and 17, respectively, are substantially in contact with the transparent diode mounting element 26. The light emitting diodes 24 on such element are pointed towards the reflector 28 at the rear to minimize hot spot presentations on the dial face and pointer displays. Light is reflected from the reflector 28 to the surface of diffusers 20 and 19 of the main dial face display 15 and the concentric pointer drum presentation 17.

Preferably, Mylar (polyester) and vinyl based diffusers which exhibit light transmission factors of approximately 50% are employed. In this embodiment diffusers are employed whose color is eggshell white to the eye and negative films 16 and 17' are employed whose background is a solid black color at the non-exposed areas. Thus, a high contrast ratio is provided between the white indicia and pointer, and black background of the dial face and pointer drum displays, which are fully readable with or without the lighting system energized.

Multiple colored displays or rangeband marks can be provided by employing one or a combination of the following: different wavelength light emitting diodes; different colored diffusers; or different wavelength filters between the negative and diffuser surfaces.

Now referring to FIG. 3 of the drawing there is shown a modification of the device of FIGS. 1 and 2. In FIG. 3, in place of the developed negative film 16 employed in the device of FIG. 1, a reverse silk screened presentation is employed both for the dial face presentation 15a and concentric pointer drum presentation 17a. Thus, in FIG. 3 the dial face display is reverse silk screened at 30 directly onto the diffuser element 20 and such diffuser is laminated to the high light transmission element 22. Similarly, the concentric pointer drum display 17a is reverse silk screened at 32 onto the diffuser element 19, and such reverse silk screened presentation on the diffuser element 19 is laminated to the high light transmission material 21.

In this embodiment there is utilized a solid black background for both the dial face and pointer drum presentations, the diffuser being white, with the white color of the diffuser material forming the display marks or indicia.

Now referring to FIGS. 4 and 5 of the drawing, except for the pointer presentation and the means for illumination thereof, the reverse silk screened dial face presentation and means for illumination thereof of this embodiment is similar to that of FIG. 3. In place of the concentric pointer drum 17a of FIG. 3, a pointer 34 is employed preferably formed of a transparent plastic such as an acrylic resin, which is transilluminated by a light bar 36 containing a cluster of light emitting diodes 38. These light emitting diodes are ground and polished to form a thin flat-pack assembly of the diodes onto the light bar and provide a maximum wide angle coupling of light flux into the pointer cavity 40. The light bar 36 is oriented towards the pointer cavity 40 and is received within a central aperture 41 in the diode mounting element 26'. Electrical connections at 43 are provided for connection to an external electrical circuit (not shown).

It will be noted that the clear light transmitting mounting 26' for the light emitting diodes 24 is provided with an opaque paint at 42 to match the same background color of the dial face presentation 15a provided by the color of the diffuser 20 of such dial face presentation.

Also, it is noted that the pointer 34 contains a thin layer indicated at 44, of white paint mixed with a translucent gel to obtain a desired uniform brightness.

If desired, the light emitting diode mounting 26' and the light emitting diodes 24 thereon can be connected to and form a part of the laminated dial face assembly 15a.

Further if desired, the negative film and diffuser combination for the dial face display 15 in FIG. 1 can be employed in place of the reverse silk screened presentation of the dial face display on a diffuser surface employed in FIGS. 4 and 5.

Referring now to FIGS. 6 and 7 of the drawing, the design of this embodiment is somewhat similar to that of FIGS. 4 and 5. However, the design of the optics of the present embodiment is different from that of FIGS. 4 and 5, and makes the light emitting diodes 24 employed for illuminating the dial face display 15a more accessible for replacement. Thus, the same transilluminated dial face assembly 15a and the same transilluminated pointer assembly 34 is employed as in FIGS. 4 and 5. However, in the present embodiment there is employed a mounting 46 having a conically shaped peripheral reflector 48 disposed at an angle of about 45° with the central axis of mounting member 46, and a cooperating reflector element 50 having a complementary peripheral conical surface 52 disposed at an angle of about 45°, thus providing reflecting surfaces for backlighting the dial face presentation 15a. Referring particularly to FIG. 7, it will be noted that the reflector element 50 has an outer diameter smaller than the inner diameter of the reflector portion 48 of element 46, so that element 50 can be positioned within element 46, with the peripheral edge 54 of element 50 in contact with the inner surface of the flat base portion 56 of the diode mounting element 46. Thus, the light emitting diodes 24 mounted on the reflector surface 48 are positioned in relation to the conical reflector surfaces 48 and 52 to reflect and direct light from such reflectors onto the dial face diffuser surface 20 of the dial face presentation 15a.

It is further noted that element 50 is provided with a centrally disposed coating 58 of opaque paint to match the same background color of the diffuser element 20 of the dial face presentation 15a.

It is also noted that the flat portion 56 of the light reflector element 46 is centrally apertured at 60 and the reflector element 50 has a central aperture 62 to receive the light bar 36.

If desired, the assembly of the light reflector elements 46 and 50 can form an integral part of the laminated dial face assembly 15a.

As previously noted, any light emitting diodes can be employed in the invention system to provide a predetermined luminous intensity at diode nominal forward currents ranging from about 10 to about 40 milliamperes, and forward voltages ranging from about 1.5 to about 3.0 volts, and any colors such as red, green and yellow light emitting diodes can be selected to provide contrasting lighted displays of the dial face and pointer presentations. Since such light emitting diodes are commercially available and are well known, details of their structure which form no part of the present invention, are not given herein.

From the foregoing, it is seen that the invention provides improved illuminated presentations or displays of the dial face and associated pointer or pointer drum assemblies of instruments, particularly aircraft instruments, incorporating (a) a negative or color film and diffuser assembly, or reverse silk screened diffuser assembly, for the dial face and pointer presentations, (b) light emitting diodes and (c) a reflector or optical assembly for back-lighting the dial face and pointer presentations. With such device, a high contrast ratio can be achieved and a full reading of the dial presentation can be obtained in a high ambient lighting environment or with the lighting circuit de-energized, and with the diffuser element located behind the negative film or reverse screened presentation, parallax problems are avoided. The combination of the negative and diffuser or silk screened presentation on the diffuser, laminated in a clear plastic such as acrylic or other high light transmission material provides dial face rigidity and long operating life. The light emitting diodes not only provide high intensity displays, but their reliability and long life, together with the fact that they operate cooler and consume much less power for a given amount of light than incandescent light sources, and their high immunity to damage from mechanical shock and vibration, are particularly advantageous over conventional incandescent lighting systems or integrally lighted displays of commercial and military aircraft.

Although the system of the invention has been described for application as indicator dial systems for instruments, the system can also be used for light plate presentations.

While particular embodiments of the invention have been described for purposes of illustration, it will be understood that other variations and modifications of the invention will occur to those skilled in the art and the invention accordingly is not to be taken as limited except by the scope of the appended claims.

What is claimed is:

1. An indicator dial system for instruments, which comprises a display of an instrument dial face in the form of a developed photographic film or a reverse silk screened presentation of said instrument dial face, a light diffuser element, said display of an instrument dial face being mounted on one side of said diffuser element, a high light transmission element mounted on the other side of said diffuser element and supporting same, a light source spaced from and positioned on the opposite side of said high light transmission element from said diffuser element, said light source comprising light emitting diode means, means supporting said light emitting diode means in spaced relation to said light transmission element, and reflector means at the rear of said light transmission element for backlighting said instrument dial face display, said reflector means being positioned to reflect light from said light emitting diode means through said light transmission element to said diffuser element, said diffuser element diffusing the light received from said high light transmission element for uniformly illuminating said instrument dial face display.

2. An indicator dial system as defined in claim 1, wherein said instrument dial face display and said light diffuser element are laminated to said high light transmission element to provide dial face rigidity.

3. An indicator dial system as defined in claim 2, said light diffuser element being in the form of a thin polyester or vinyl based film and said high light transmission element being an acrylic material, said high light transmission material providing dial face rigidity.

4. An indicator dial system as defined in claim 1, said light diffuser element and said high light transmission element both being plastic materials.

5. An indicator dial system as defined in claim 1, said light diffuser element being in the form of a thin polyester or vinyl based film and said high light transmission element being an acrylic material.

6. An indicator dial system as defined in claim 1, employing a black and white, or a colored negative display of said instrument dial face.

7. An indicator dial system as defined in claim 4, employing a black and white, or a colored negative display of said instrument dial face, said dial face display containing indicia, the indicia on said negative film being formed by the color of said diffuser element at the exposed areas on said developed negative.

8. Illuminating dial and pointer system for instruments, which comprises an instrument cover case for said system, and containing a display of an instrument dial face having indicia thereon, dial pointer display means concentrically mounted for rotation with respect to said dial face display, said instrument dial face display being in the form of a developed photographic film for a reverse silk screened presentation of said instrument dial face, a light diffuser element, said dial face display positioned in front of said diffuser element and in contact therewith, a high light transmission element mounted to the rear of said light diffuser element and in contact therewith for supporting same, and a light source positioned to the rear of said high light transmission element for directing light thereto, said light source comprising light emitting diode means, and reflector means positioned to the rear of said high light transmission element, said light emitting diode means being positioned to direct light toward said reflector means, said reflector means directing reflected light to said high light transmission element, said diffuser element diffusing the light received from said high light transmission element and uniformly illuminating said instrument dial face display and said dial pointer means.

9. Illuminating dial and pointer system as defined in claim 8, said light emitting diode means comprising a light transmitting mounting member and a plurality of light emitting diodes positioned in spaced relation around the periphery of said mounting member, said reflector means being positioned to the rear of said mounting member and said light emitting diodes thereon.

10. Illuminating and pointer system as defined in claim 8, wherein said dial pointer display means comprises a pointer drum including a pointer display in the form of a photographic film or a reverse silk screened presentation of an instrument pointer, a second light diffuser element, said pointer display positioned in front of said last mentioned diffuser element and in contact therewith, and a second high light transmission element mounted to the rear of said second diffuser element and in contact therewith.

11. Illuminated dial and pointer system as defined in claim 10, said dial face display being centrally apertured and receiving said pointer drum for rotation with respect to said dial face display and the indicia thereon.

12. Illuminated dial and pointer system as defined in claim 8, said dial pointer display means comprising a pointer containing a layer of colored paint mixed with translucent gel to provide a predetermined uniform brightness of illumination.

13. Illuminated dial and pointer system as defined in claim 8, said dial pointer display means comprising a dial pointer, said dial face display being centrally apertured to receive said dial pointer for rotation with respect to said dial face display and the indicia thereon, and including additional light emission diode means mounted to the rear of said pointer for backlighting said pointer.

14. Illuminated dial and pointer system as defined in claim 13, said last mentioned light emitting diode means comprising a light bar containing a cluster of light emitting diodes, said assembly of said dial face display, said light diffuser element and said high light transmitting element being apertured to receive said light bar.

15. Illuminated dial and pointer system as defined in claim 8, wherein said instrument dial face display and said light diffuser element are laminated to said high light transmission element to provide dial face rigidity.

16. Illuminated dial and pointer system as defined in claim 15, wherein said dial pointer display means comprises a pointer drum including a pointer display in the form of a photographic film or a reverse silk screened presentation of an instrument pointer, a second light diffuser element, said pointer display positioned in front of said last mentioned diffuser element and in contact therewith and a second high light transmission element mounted to the rear of said diffuser element and in contact therewith, said pointer display and said second light diffuser element being laminated to said last mentioned high light transmission element.

17. Illuminated dial and pointer system as defined in claim 16, said light diffuser elements being in the form of a thin polyester or vinyl film and said high light transmission elements being an acrylic material, and employing a black and white, or a colored display of said dial face and of said pointer display.

18. Illuminated dial and pointer system as defined in claim 15, said light diffuser element and said high light transmission element both being plastic materials.

19. Illuminated dial pointer system as defined in claim 17, said light diffuser element being in the form of a thin polyester or vinyl film and said high light transmission element being an acrylic material.

20. Illuminated dial and pointer system as defined in claim 16, said light diffuser elements and said high light transmission elements being plastic materials.

21. An indicator dial system for instruments, which comprises a display of an instrument dial face in the form of a developed photographic film or a reverse silk screened presentation of said instrument dial face, a light diffuser element, said display of an instrument dial face being mounted on one side of said diffuser element, a high light transmission element mounted on the other side of said diffuser element and supporting same, and a light source spaced from and positioned on the opposite side of said high light transmission element from said diffuser element, said light source comprising light emitting diode means, said light emitting diode means comprising a mounting member and a plurality of light emitting diodes positioned in spaced relation around the periphery of said mounting member, and reflector means for backlighting said instrument dial face display, said light emitting diode means and said mounting member being positioned to direct light against said reflector means, said reflector means being mounted and positioned to reflect light from said light emitting diode means through said light transmission element to said diffuser element, said diffuser element diffusing the light received from said high light transmission element for uniformly illuminating said instrument dial face display.

22. An indicator dial system as defined in claim 21, wherein said instrument dial face display and said light diffuser element are laminated to said high light transmission element to form an assembly providing dial face rigidity, said light diffuser element and said high light transmission element both being plastic materials, said mounting member being transparent and said reflector means being positioned on the opposite side of said mounting member from said laminated assembly.

23. Illuminating dial and pointer system for instruments, which comprises an instrument cover case for said system, and containing a display of an instrument dial face having indicia thereon, dial pointer display means mounted for rotation with respect to said dial face display, said instrument dial face display being in the form of a developed photographic film or a reverse silk screened presentation of said instrument dial face, a light diffuser element, said dial face display positioned in front of said diffuser element and in contact therewith, a high light transmission element mounted to the rear of said light diffuser element and in contact therewith for supporting same, and a light source positioned to the rear of said high light transmission element for directing light thereto, said light source comprising light emitting diode means, and conically shaped reflector means comprising at least one conically shaped reflector for backlighting said dial face display, said light emitting diode means comprising a plurality of light emitting diodes positioned in spaced relation around the periphery of said reflector and positioned to direct light against said reflector and for directing reflected light from said reflector to said high light transmission element, said diffuser element diffusing the light received from said high light transmission element and uniformly illuminating said instrument dial face display.

24. Illuminated dial and pointer display system as defined in claim 23, said conically shaped reflector means including a pair of conically shaped reflectors, said light emitting diodes mounted around the periphery of one of said reflectors the angles of said reflectors being selected and said reflectors being positioned with respect to each other for directing reflected light from said reflectors to said high light transmission element of said dial face display.

25. Illuminated dial and pointer system as defined in claim 23, wherein said dial pointer display means comprises a pointer drum including a pointer display in the form of a photographic film or a reverse silk screened presentation of an instrument pointer, a second light diffuser element, said pointer display positioned in front of said last mentioned diffuser element and in contact therewith, and a second high light transmission element mounted to the rear of said second diffuser element and in contact therewith, said dial face display being centrally apertured and receiving said pointer drum for rotation with respect to said dial face display and the indicia thereon.

* * * * *